(12) United States Patent
Irie

(10) Patent No.: US 11,458,555 B2
(45) Date of Patent: Oct. 4, 2022

(54) WIRE ELECTRICAL DISCHARGE MACHINE

(71) Applicant: FANUC CORPORATION, Minamitsuru-gun (JP)

(72) Inventor: Shouta Irie, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 361 days.

(21) Appl. No.: 16/780,487

(22) Filed: Feb. 3, 2020

(65) Prior Publication Data
US 2020/0246893 A1 Aug. 6, 2020

(30) Foreign Application Priority Data
Feb. 6, 2019 (JP) .............................. JP2019-019675

(51) Int. Cl.
*B23H 7/04* (2006.01)
*B23H 7/10* (2006.01)
*G05B 19/401* (2006.01)

(52) U.S. Cl.
CPC ............ *B23H 7/04* (2013.01); *B23H 7/105* (2013.01); *G05B 19/401* (2013.01); *G05B 2219/45043* (2013.01); *G05B 2219/45221* (2013.01)

(58) Field of Classification Search
CPC ........ B23H 7/04; B23H 7/105; G05B 19/401; G05B 2219/45043; G05B 2219/45221
See application file for complete search history.

(56) References Cited

U.S. PATENT DOCUMENTS

2015/0367436 A1* 12/2015 Hiraga .................. B23H 7/06
 700/162
2016/0107251 A1 4/2016 Takemoto et al.
(Continued)

FOREIGN PATENT DOCUMENTS

JP H03-121721 A 5/1991
JP H07-009262 A 1/1995
(Continued)

OTHER PUBLICATIONS

Extended European Search Report dated Jul. 2, 2020 for European Patent Application No. 20155919.2-1017.
(Continued)

*Primary Examiner* — Geoffrey S Evans
(74) *Attorney, Agent, or Firm* — McGinn I.P. Law Group, PLLC.

(57) ABSTRACT

A wire electrical discharge machine includes an upper wire guide and a lower wire guide supporting a wire electrode, a probe provided on an upper guide block having the upper wire guide, an offset storage unit for storing an offset amount from the upper wire guide to the probe, a position shift drive unit for changing the relative position between the table, and the upper and lower wire guides, a drive controller for controlling the position shift drive unit, a contact position calculator for calculating a contact position that is a position of the probe when it comes in contact, and a machining start position calculator for calculating a machining start position of the wire electrode, based on at least two contact positions and the offset amount. The drive controller controls the position shift drive unit so that the position of the wire electrode becomes the machining start position.

15 Claims, 6 Drawing Sheets

(56) References Cited

U.S. PATENT DOCUMENTS

2017/0087656 A1* 3/2017 Hasegawa ................ B23H 7/02
2018/0029153 A1* 2/2018 Ookubo ................ B23H 7/105

FOREIGN PATENT DOCUMENTS

| JP | H07-136855 A | 5/1995 |
| JP | 2003-311542 A | 11/2003 |
| JP | 2008-044033 A | 2/2008 |
| JP | 2013-215830 A | 10/2013 |
| JP | 2018-015830 A | 2/2018 |

OTHER PUBLICATIONS

Japanese Office Action, dated Jun. 1, 2021, in Japanese Application No. 2019-019675 and English Translation thereof.

* cited by examiner

WIRE ELECTRICAL DISCHARGE MACHINE

CROSS-REFERENCE TO RELATED APPLICATION

This application is based upon and claims the benefit of priority from Japanese Patent Application No. 2019-019675 filed on Feb. 6, 2019, the contents of which are incorporated herein by reference.

BACKGROUND OF THE INVENTION

Field of the Invention

The present invention relates to a wire electrical discharge machine that performs electrical discharge machining on a workpiece by generating electric discharge between a wire electrode and the workpiece.

Description of the Related Art

As described in Japanese Laid-Open Patent Publication No. 07-009262, a wire electrical discharge machine is provided with a contact-type probe for measuring the shape of a workpiece in order to measure the workpiece before and after machining, thereby enhancing machining accuracy.

SUMMARY OF THE INVENTION

However, conventionally, the measurement result of the contact-type probe has not been used to determine the appropriate position of the wire electrode at the start of machining on the workpiece that is actually supported on the table.

It is therefore an object of the present invention to provide a wire electrical discharge machine that enables the wire electrode to be positioned at an appropriate machining start position relative to a workpiece supported on a table.

According to an aspect of the present invention, a wire electrical discharge machine for performing electrical discharge machining on a workpiece by applying a voltage across a gap between a wire electrode and the workpiece to generate electric discharge at the gap while changing the relative position on a predetermined plane, between a table supporting the workpiece and the wire electrode, includes: an upper wire guide configured to support the wire electrode above the workpiece supported by the table; a lower wire guide configured to support the wire electrode below the workpiece supported by the table; a probe provided on an upper guide block to which the upper wire guide is mounted, the probe being configured to detect contact with an object; an offset storage unit configured to store an offset amount from the upper wire guide to the probe in the plane; a position shift drive unit configured to change the relative position between the table, and the upper wire guide and the lower wire guide; a drive controller configured to control the position shift drive unit so that the probe contacts at least two points on the workpiece; a contact position calculator configured to calculate a contact position that is a position of the probe in the plane with respect to the table when the probe comes into contact with the workpiece; and a machining start position calculator configured to calculate a machining start position of the wire electrode with respect to the workpiece, based on the at least two calculated contact positions and the offset amount, and the drive controller is configured to control the position shift drive unit so that the position of the wire electrode with respect to the workpiece in the plane becomes the machining start position.

According to the present invention, it is possible to position the wire electrode at an appropriate machining start position relative to the workpiece supported on the table.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A wire electrical discharge machine according to the present invention will be detailed below by describing a preferred embodiment with reference to the accompanying drawings.

Embodiment

Figure 1:
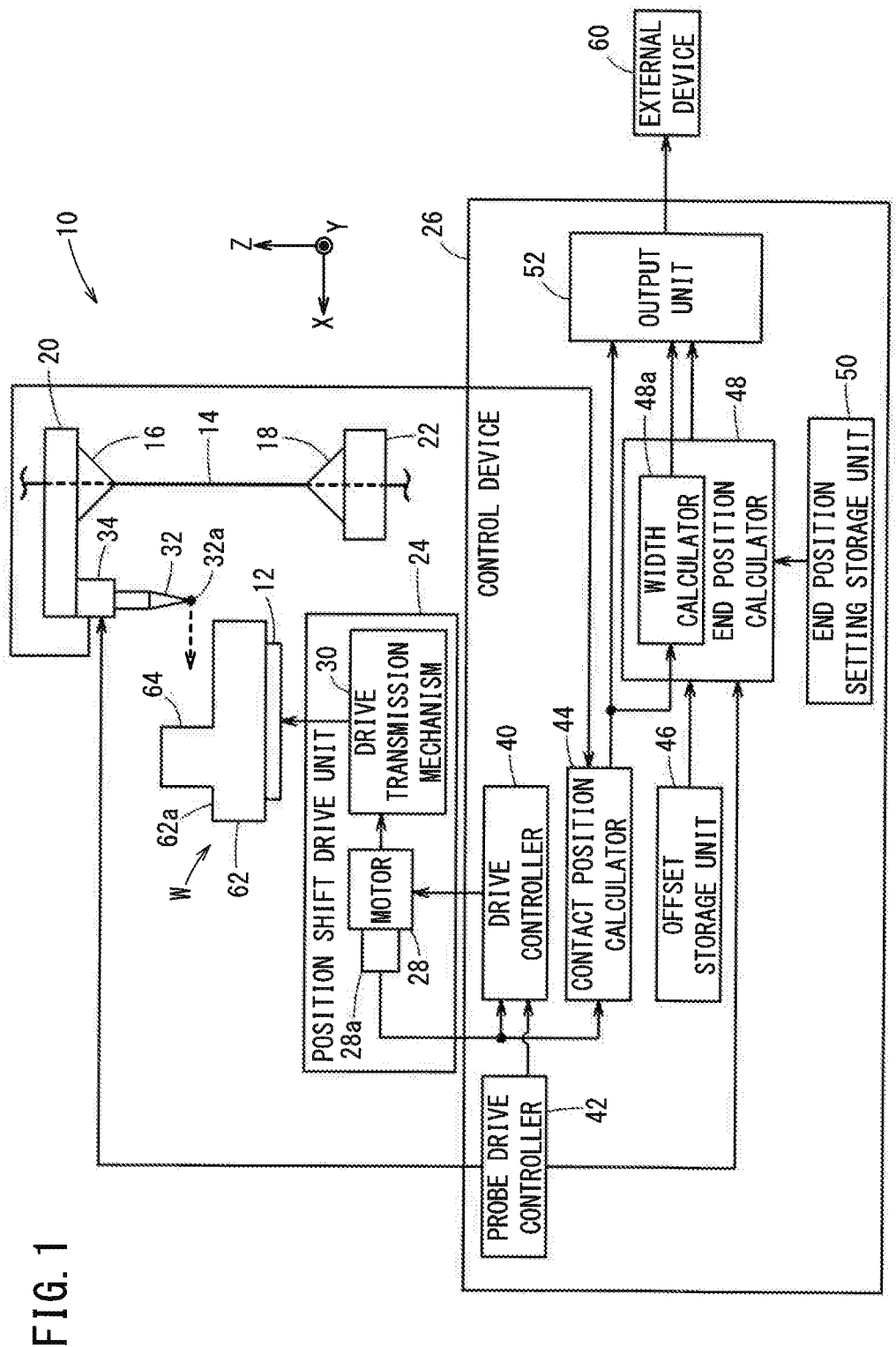
FIG. 1 is a schematic configuration diagram of a wire electrical discharge machine in an embodiment.

FIG. 1 is a diagram showing a schematic configuration of a wire electrical discharge machine 10 according to an embodiment. The wire electrical discharge machine 10 performs electrical discharge machining on a workpiece W in accordance with a predetermined machining program by applying voltage across a discharge gap formed between a wire electrode 14 and the workpiece W to generate electric discharge while changing the relative position between a table 12 that supports the workpiece W and the wire electrode 14, in a predetermined plane. The X-axis direction, the Y-axis direction and the Z-axis direction shown in FIG. 1 are orthogonal to each other, and the aforementioned predetermined plane is the XY plane perpendicular to the Z-axis direction.

The wire electrical discharge machine 10 includes an upper wire guide 16 that supports the wire electrode 14 above the workpiece W supported on the table 12 (Z-axis positive side), a lower wire guide 18 that supports the wire electrode 14 below the workpiece W (Z-axis negative side), an upper guide block 20 on which the upper wire guide 16 is installed, and a lower guide block 22 on which the lower wire guide 18 is installed. Though not illustrated, the wire electrode 14 is supplied in the feed direction at a predetermined rate from a supply roll, travels through the upper wire guide 16 and the lower wire guide 18 and is then collected into a collection box. The wire electrical discharge machine 10 further includes a position shift drive unit 24 that shifts the position of the table 12 relative to the upper wire guide 16 and the lower wire guide 18 in the X-axis direction and the Y-axis direction, and a control device 26 that controls the position shift drive unit 24. The position shift drive unit 24 includes motors 28, encoders 28a for the motors 28 and a drive transmission mechanism 30. The motors 28 are provided for moving the table 12 in the X-axis direction and the Y-axis direction, respectively. The drive transmission mechanism 30 is comprised of ball screws and nuts fixed on the table 12 for converting the rotational motions of the X-axis and Y-axis motors 28 into linear motions of the table 12 in the X-axis direction and Y-axis direction. In the present embodiment, the position shift drive unit 24 will be described as driving the table 12 in order to shift the relative position between the table 12 and the upper wire guide 16 and the lower wire guide 18. However, the position shift drive unit 24 may be configured to shift the relative position between the table 12 and the upper wire guide 16 and the lower wire guide 18 by driving the upper wire guide 16 and the lower wire guide 18. Further, the position shift drive unit 24 may be configured to drive both the table 12 and the upper wire guide 16 and the lower wire guide 18 so as to change the relative position between the table 12 and the upper wire guide 16 and the lower wire guide 18.

The upper guide block 20 of the wire electrical discharge machine 10 is provided with a probe 32 for sensing contact with an object and a probe drive unit 34 for driving the probe 32. The probe drive unit 34 can move the probe 32 to a measurement position and to a retracted position. The measurement position is a state in which the tip 32a of the probe 32 is positioned at such a height as to be able to come into contact with the workpiece W. The retracted position is a state in which the probe 32 is raised in the Z-axis direction so that the tip 32a is kept out of contact with the workpiece W without interference. FIG. 1 shows the probe 32 set at the measurement position.

The control device 26 includes a drive controller 40, a probe drive controller 42, a contact position calculator 44, an offset storage unit 46, an end position calculator 48, an end position setting storage unit 50 and an output unit 52. The control device 26 has a processor such as a CPU and a memory and functions as the control device 26 of the present embodiment by executing a program stored in the memory.

The drive controller 40 controls the position shift drive unit 24 by controlling the motors 28 based on output values from the encoders 28a.

The probe drive controller 42 causes the probe drive unit 34 to move the probe 32 to the measurement position when contact-sensing by the probe 32 is performed. Then, the probe drive controller 42 controls the probe drive unit 34 to move the probe 32 to the retracted position after completion of the contact sensing by the probe 32.

The contact position calculator 44, based on the output values from the encoders 28a and other information, calculates a position of the probe 32 in the XY plane with respect to the table 12 when the probe 32 comes into contact with the workpiece W, which will be hereinafter referred to as a contact position.

The offset storage unit 46 has previously stored an offset amount of the probe 32 from the upper wire guide 16 in the XY plane.

The end position calculator 48, based on the setting of the end position of the wire electrode 14 stored in the end position setting storage unit 50, calculates the end position on the XY plane to which the wire electrode 14 is positioned relative to the workpiece W after completion of the measurement operation by the probe 32. Here, the end position calculator 48 has a width calculator 48a for calculating the width of a measurement target based on at least two contact positions calculated by the contact position calculator 44 in order to obtain the end position based on the width of the measurement target of the workpiece W. Here, the width calculator 48a may be provided in the control device 26, separately from the end position calculator 48.

The end position setting storage unit 50 stores the end position setting of the wire electrode 14 designated by the user. Specifically, the user can select as the end position setting of the wire electrode 14, for example, "start position", "wire electrode positioned at center", and "probe positioned at center". This will be described later.

The output unit 52 outputs the measurement result by the probe 32 or data obtained from the measurement result to an external device 60 such as a calculation device installed outside the wire electrical discharge machine 10. The output unit 52 may include a display unit to display the data on the display unit as external output of the data. Thus, it is possible to enhance user convenience.

Figure 2:
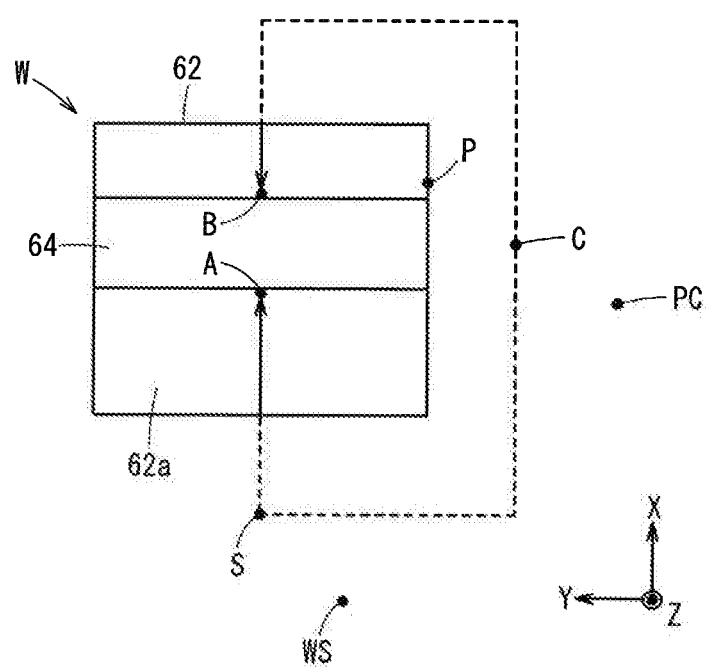
FIG. 2 is a top view for explaining a measurement operation for a workpiece with a probe in the embodiment.
Figure 3:
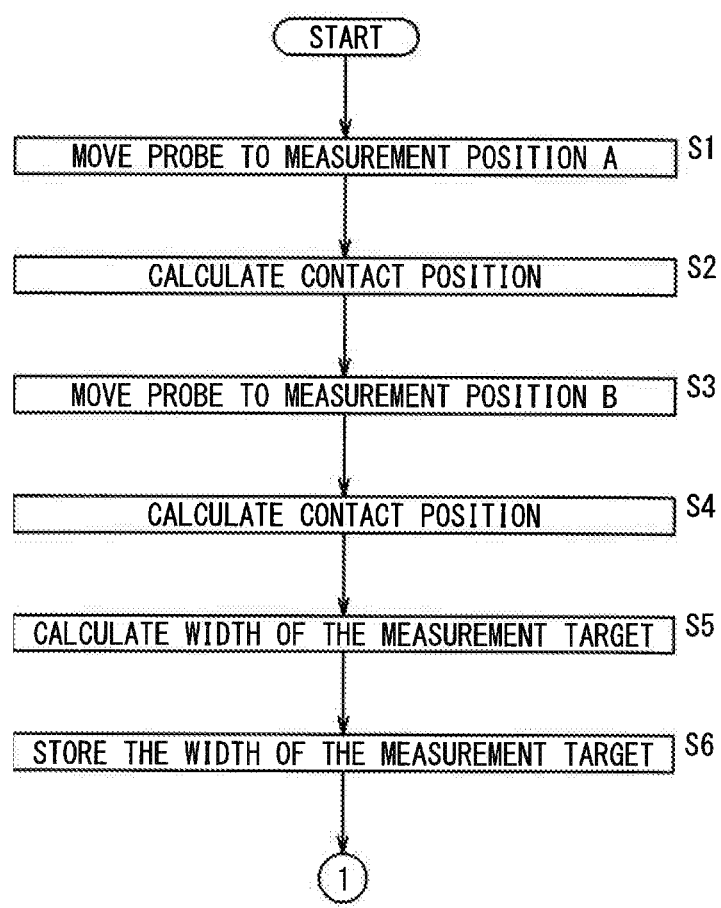
FIG. 3 is a flowchart for explaining the operation of the wire electrical discharge machine in the embodiment.
Figure 4:
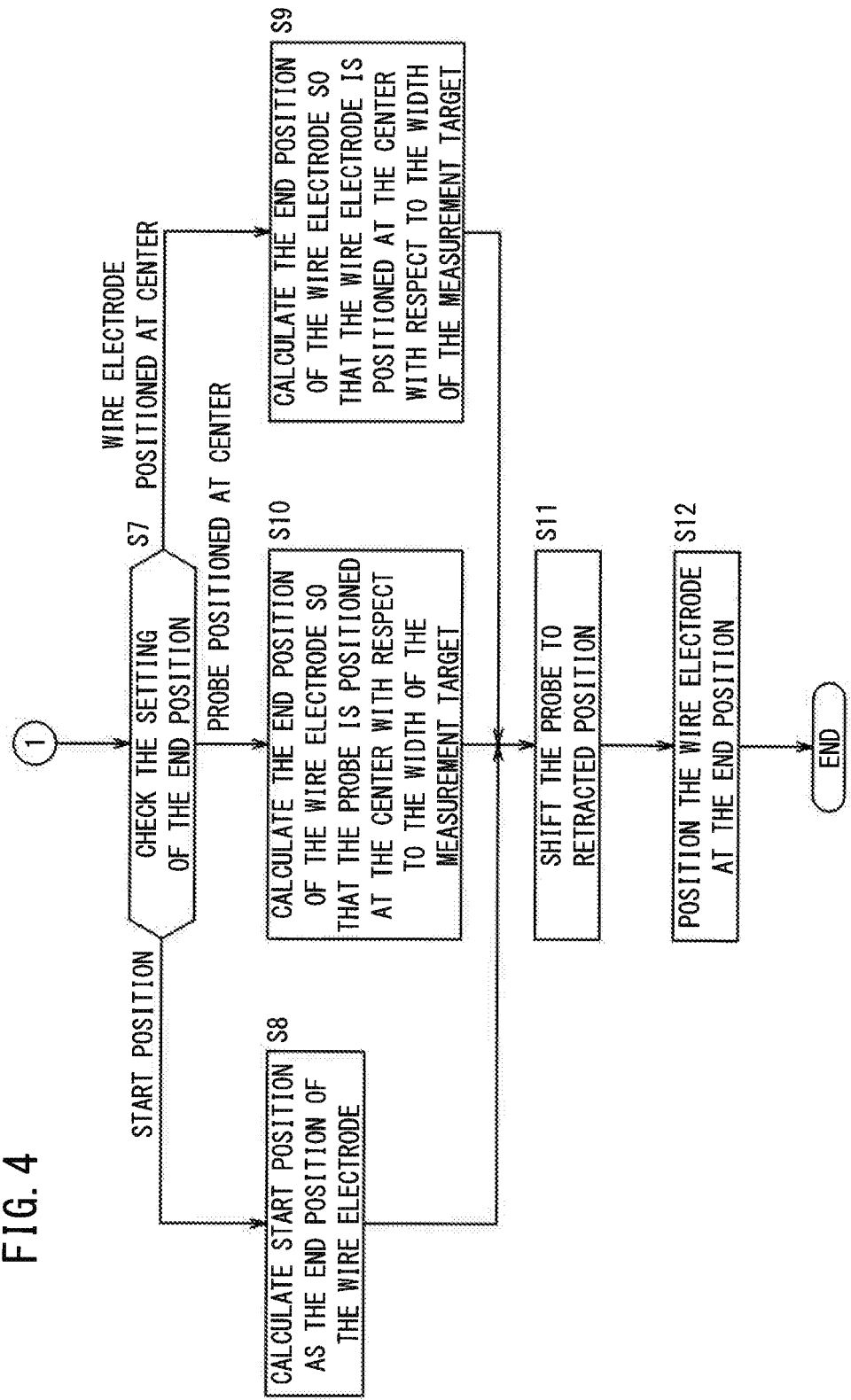
FIG. 4 is a flowchart for explaining the operation of the wire electrical discharge machine in the embodiment.

Next description will be given on the operation of the wire electrical discharge machine 10 from the start of the measurement operation on the workpiece W by the probe 32 to the positioning of the wire electrode 14 at the end position. FIG. 2 is a top view for explaining the measurement operation on the workpiece W by the probe 32 in the embodiment. FIGS. 3 and 4 are flowcharts for explaining the operation of the wire electrical discharge machine 10 in the embodiment.

Before start of the measurement operation with the probe 32, the user selects one option from "start position", "wire electrode positioned at center" and "probe positioned at center", through an unillustrated input device of the control device 26, as the setting of the end position of the wire electrode 14. The selected setting of the end position of the wire electrode 14 is stored in the end position setting storage unit 50. As shown in FIGS. 1 and 2, the workpiece W is formed of a main part 62 having a predetermined thickness and extending along a predetermined XY plane, and a projected part 64 protruding upright from an upper surface 62a of the main part 62. The projected part 64 is the measurement target of the workpiece W by the measurement operation with the probe 32.

At the start of the measurement operation, the probe 32 is located at a start position S in FIG. 2. In this embodiment, the table 12 is driven in order to change the relative position between the table 12, and the upper wire guide 16 and the lower wire guide 18, but in FIG. 2, a route of relative movement of the probe 32 relative to the workpiece W supported on the table 12 on the XY plane is shown.

As the measurement operation is started, the drive controller 40 controls the position shift drive unit 24 to move the table 12 and the workpiece W, so that the probe 32 relatively moves from the start position S to a measurement position A in FIG. 2 (FIG. 3, step S1). Then, the contact position calculator 44 calculates the position (i.e., contact position) of the probe 32 in the XY plane with respect to the table 12 when the probe 32 comes into contact with the workpiece W at the measurement position A (step S2). Here, the contact position calculator 44 calculates the contact position using output values from the encoder 28a.

Next, the drive controller 40 controls the position shift drive unit 24 to move the workpiece W, so that the probe 32 relatively moves to the measurement position B in FIG. 2 (step S3). The measurement position A and the measurement position B do not necessarily have to have the same Y-coordinate as long as the measurement position A and the measurement position B are in contact with the respective opposite sides of the projected part 64 with respect to the width direction. Though in FIG. 2 the movement from the measurement position A to the measurement position B is shown as a route by way of the start position S along the broken line, the route from the measurement position A to the measurement position B is not limited to this. The contact position calculator 44 calculates the position (i.e., contact position) of the probe 32 in the XY plane with respect to the table 12 when the probe 32 comes into contact with the workpiece W at the measurement position B (step S4). The output unit 52 may externally output, as the position of the workpiece W, the two contact positions calculated by the contact position calculator 44 at steps S2 and S4.

Then, the width calculator 48a, based on the two contact positions calculated by the contact position calculator 44 at steps S2 and S4, calculates the width of the measurement target of the workpiece W, i.e., the projected part 64, in the X-axis direction (step S5). The output unit 52 may output the width of the projected part 64 in the X-axis direction calculated at step S5 to the outside. The width of the projected part 64 calculated at step S5 is stored in the storage unit of the control device 26 (step S6).

Next, the end position calculator 48 checks the setting of the end position of the wire electrode 14 stored in the end position setting storage unit 50 (FIG. 4, step S7).
When the setting of the end position of the wire electrode 14 indicates "start position" (step S7, start position), the end position calculator 48 calculates the start position WS of the wire electrode 14 when the probe 32 is positioned at the start position S in FIG. 2, as the end position (step S8). In the present embodiment, it is assumed that the positions of the upper wire guide 16, the lower wire guide 18 and the wire electrode 14 in the XY plane coincide with each other. Therefore, the start position S and the start position WS are located apart from each other by the offset amount.

When the setting of the end position of the wire electrode 14 indicates "wire electrode positioned at center" (step S7, the wire electrode positioned at center), the end position calculator 48, based on the two contact positions calculated at steps S2 and S4 and the offset amount, calculates the end position of the wire electrode 14 so that the wire electrode 14 becomes positioned at the width center of the projected part 64 with respect to the width direction (the X-axis direction) (step S9). Specifically, the end position calculator 48 calculates the end position of the wire electrode 14 so that the position of the wire electrode 14 serves as the center position C in FIG. 2. At this time, the probe 32 is located at the position P. The end position of the wire electrode 14 calculated at step S9 becomes the machining start position of the wire electrode 14 on the workpiece W. That is, in this case, the end position calculator 48 functions as a machining start position calculator that calculates the machining start position of the wire electrode 14. Therefore, the output unit 52 may externally output the end position calculated by the end position calculator 48 at step S9 as the machining start position. Note that the end position (machining start position) calculated at step S9 may be a position shifted by a predetermined distance from the width center of the projected part 64 in the width direction (the X-axis direction). Further, the end position calculator 48 (machining start position calculator) may calculate the machining start position based on the width of the projected part 64 calculated at step S5 and the offset amount.

Further, when the setting of the end position of the wire electrode 14 indicates "probe positioned at center", (step S7, "probe positioned at center"), the end position calculator 48 calculates, as the end position of the wire electrode 14, the position at which the wire electrode 14 is located when the probe 32 is positioned at the center C in FIG. 2 (step S10). At this time, the end position of the wire electrode 14 is located at a position PC that is located apart from the center position C by the offset amount.

After steps S7 to S9, the probe drive controller 42 controls the probe drive unit 34 to move the probe 32 to the retracted position (step S11). Thereafter, the drive controller 40 controls the position shift drive unit 24 to position the wire electrode 14 at the end position calculated in steps S7 to S9 (step S12). Note that step S11 need not be executed immediately before step S12 as long as it is executed after step S4 and before step S12.

When step S9 has been performed, at step S12 the drive controller 40 causes the position shift drive unit 24 to set the position of the wire electrode 14 in the XY plane relative to the workpiece W, as the machining start position. At step S11 before step S12, the probe drive controller 42 causes the probe drive unit 34 to move the probe 32 to the retracted position before the drive controller 40 starts moving the wire electrode 14 to the machining start position. Therefore, when the wire electrode 14 is positioned at the center position C that is the machining start position, the probe 32 residing at the position P does not contact the workpiece W. Thus, accidental contact or unnecessary contact can be prevented.

As described above, according to the wire electrical discharge machine 10, use of the measurement of the probe 32 on the workpiece W supported on the table 12 makes it possible to position the wire electrode 14 at an appropriate machining start position relative to the workpiece W. In particular, even if the measurement target of the probe 32 is a projected part 64, the width of the projected part 64 is determined to thereby set the end position of the wire electrode 14 to the width center of the projected part 64 in the width direction or a position shifted from the width center by a predetermined distance. Therefore, the wire electrode 14 can be positioned at an appropriate machining start position relative to the measurement target of the workpiece W.

MODIFIED EXAMPLES

The above embodiment may be modified as follows.

Modified Example 1

Figure 5:
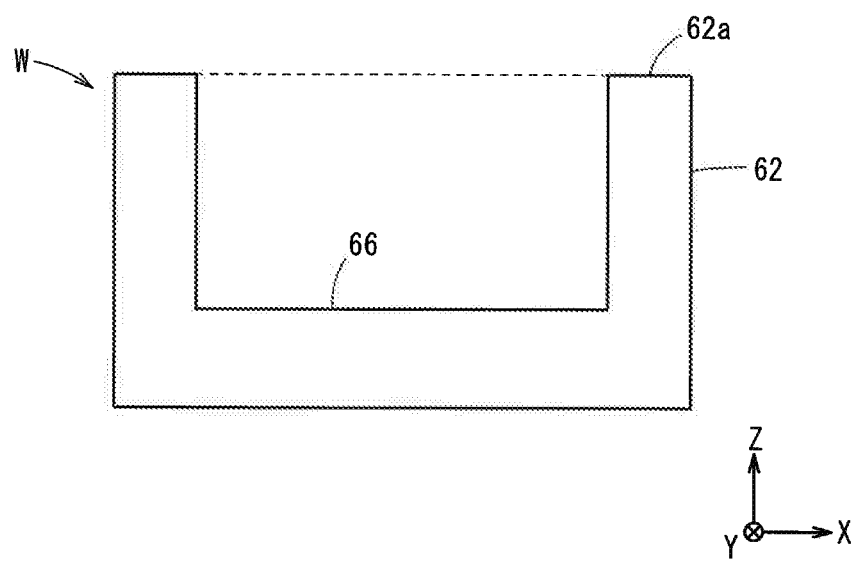
FIG. 5 is a side view of a workpiece in a modified example 1.
Figure 6:
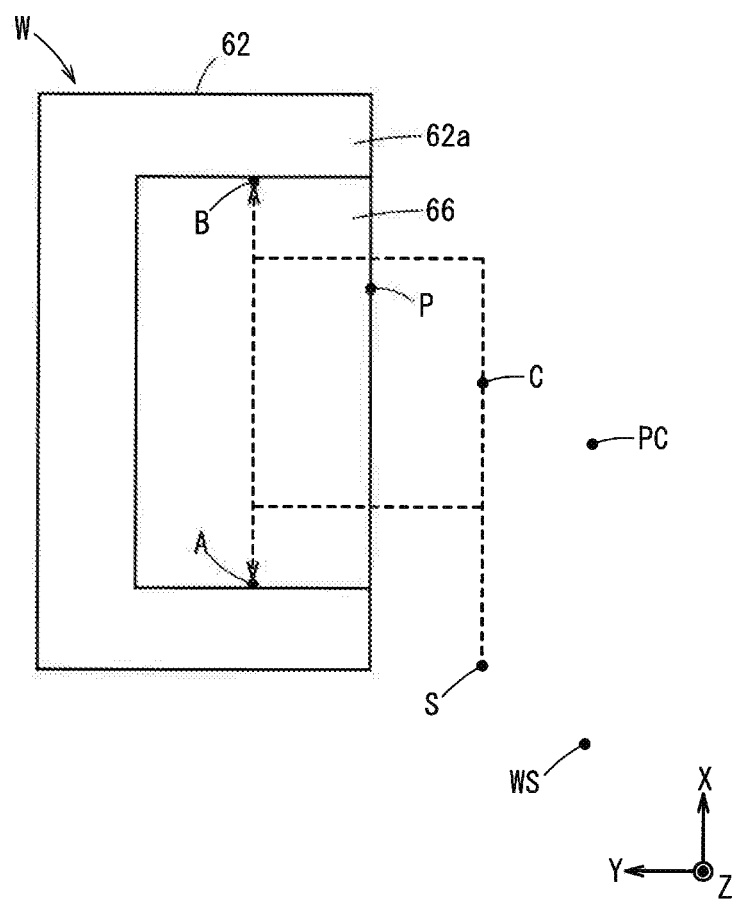
FIG. 6 is a top view for explaining a measurement operation for the workpiece with a probe in the modified example 1.

FIG. 5 is a side view of a workpiece W in a modified example 1. FIG. 6 is a top view for explaining the measurement operation for the workpiece W by the probe 32 in the modified example 1. As shown in FIGS. 5 and 6, the workpiece W is formed of a main part 62 having a predetermined thickness and extending along a predetermined XY plane (in the X-axis and Y-axis directions) and a depressed part 66 that is recessed downward from the upper surface 62a of the main part 62. In this case, the measurement target of the workpiece W subjected to the measurement by the probe 32 is the depressed part 66.

In FIG. 6, the positions designated with the same reference numerals as those in FIG. 2 are similarly defined as described in the above embodiment. The measurement position A and the measurement position B do not necessarily have to have the same Y-axis coordinate as long as the measurement position A and the measurement position B are in contact with the respective planes facing each other in the width direction in the depressed part 66. At the start of the measurement operation, the probe 32 is located at a start position S in FIG. 6. Subsequent operations are performed following the flowcharts of FIGS. 3 and 4 in the same manner as in the embodiment. Thus, even if the object to be measured by the probe 32 is the depressed part 66, the width of the depressed part 66 is determined to thereby set the end position of the wire electrode 14 to the width center of the depressed part 66 in the width direction or a position shifted from the width center by a predetermined distance. Therefore, the wire electrode 14 can be positioned at an appropriate machining start position relative to the measurement target of the workpiece W.

Modified Example 2

The above embodiment and the modified example 1 may be arbitrarily combined as long as no technical inconsistency occurs.

Invention Obtained from the Embodiment

The invention that can be grasped from the above embodiment will be described below.

The wire electrical discharge machine (10) performs electrical discharge machining on a workpiece (W) by applying a voltage across a gap between a wire electrode (14) and the workpiece (W) to generate electric discharge at the gap while changing the relative position on a predetermined plane, between a table (12) supporting the workpiece (W) and the wire electrode (14). The wire electrical discharge machine (10) includes: an upper wire guide (16) configured to support the wire electrode (14) above the workpiece (W) supported by the table (12); a lower wire guide (18) configured to support the wire electrode (14) below the workpiece (W) supported by the table (12); a probe (32) provided on an upper guide block (20) to which the upper wire guide (16) is mounted, the probe being configured to detect contact with an object; an offset storage unit (46) configured to store an offset amount from the upper wire guide (16) to the probe (32) in the plane; a position shift drive unit (24) configured to change the relative position between the table (12), and the upper wire guide (16) and the lower wire guide (18); a drive controller (40) configured to control the position shift drive unit (24) so that the probe (32) contacts at least two points on the workpiece (W); a contact position calculator (44) configured to calculate a contact position that is a position of the probe (32) in the plane with respect to the table (12) when the probe (32) comes into contact with the workpiece (W); and a machining start position calculator (48) configured to calculate a machining start position of the wire electrode (14) with respect to the workpiece (W), based on the calculated at least two contact positions and the offset amount. The drive controller (40) is configured to control the position shift drive unit (24) so that the position of the wire electrode (14) with respect to the workpiece (W) in the plane becomes the machining start position.

This configuration makes it possible to position the wire electrode (14) at an appropriate machining start position with respect to the workpiece (W).

The wire electrical discharge machine (10) may further includes: a probe drive unit (34) configured to move the probe (32) between a measurement position and a retracted position; and a probe drive controller (42) configured to cause the probe drive unit (34) to move the probe (32) to the measurement position when the probe (32) performs contact detection and further configured to cause the probe drive unit (34) to move the probe (32) to the retreated position after the contact detection by the probe (32) is completed. The probe drive controller (42) may be configured to cause the probe drive unit (34) to move the probe (32) to the retracted position before the drive controller (40) starts moving the wire electrode (14) to the machining start position. This configuration prevents accidental contact of the probe (32) against the workpiece (W) when the wire electrode (14) is positioned at the machining start position.

The drive controller (40) may be configured to control the position shift drive unit (24) so as to cause the probe (32) to contact at least two points of a measurement target in order to calculate the width of the measurement target of the workpiece (W). The wire electrical discharge machine (10) may further include a width calculator (48a) configured to calculate the width of a measurement target based on the at least two calculated contact positions, and the machining start position calculator (48) may be configured to calculate the machining start position based on the width of the measurement target and the offset amount. Thus, it becomes possible to position the wire electrode (14) at an appropriate machining start position with respect to the measurement target of the workpiece (W).

The workpiece (W) may include a main part (62) having a predetermined thickness and extending along the plane, and a projected part (64) protruding upward from the upper surface (62a) of the main part (62) or a depressed part (66) recessed downward from the upper surface (62a) of the main part (62), and the measurement target is the projected part (64) or the depressed part (66). With this configuration, regardless of whether the measurement target is a projected part (64) or a depressed part (66), it is possible to position the wire electrode (14) at an appropriate machining start position with respect to the measurement target of the workpiece (W).

The machining start position may be the center of the width of the measurement target or a position shifted from the center by a predetermined distance, with respect to the width direction of the measurement target. Owing thereto, it is possible to position the wire electrode (14) at an appropriate machining start position with respect to the measurement target.

The wire electrical discharge machine (10) may further include an output unit (52) configured to output the width of the measurement target to the outside. Thus, it is possible to improve user convenience.

The wire electrical discharge machine (10) may further include an output unit (52) configured to output, as the position of the workpiece (W), the at least two calculated contact positions to the outside. Thus, it is possible to improve user convenience.

The wire electrical discharge machine (10) may further include an output unit (52) configured to output the machining start position to the outside. Thus, it is possible to improve user convenience.

The present invention is not particularly limited to the embodiment described above, and various modifications are possible without departing from the essence and gist of the present invention.

What is claimed is:

1. A wire electrical discharge machine for performing electrical discharge machining on a workpiece by applying a voltage across a gap between a wire electrode and the workpiece to generate electric discharge at the gap while changing relative position on a predetermined plane, between a table supporting the workpiece and the wire electrode, comprising:

an upper wire guide configured to support the wire electrode above the workpiece supported by the table;

a lower wire guide configured to support the wire electrode below the workpiece supported by the table;

a probe provided on an upper guide block to which the upper wire guide is mounted, the probe being configured to detect contact with an object;

an offset storage unit configured to store an offset amount from the upper wire guide to the probe in the plane;

a position shift drive unit configured to change relative position between the table, and the upper wire guide and the lower wire guide;

a drive controller configured to control the position shift drive unit so that the probe contacts at least two points on the workpiece;

a contact position calculator configured to calculate at least two calculated contact positions including a first contact position and a second contact position that are a position of the probe in the plane with respect to the table when the probe comes into contact with the workpiece; and a machining start position calculator configured to calculate a machining start position of the wire electrode with respect to the workpiece, based on the at least two calculated contact positions and the offset amount, wherein the drive controller is configured to control the position shift drive unit so that a position of the wire electrode with respect to the workpiece in the plane becomes the machining start position, further comprising a width calculator configured to calculate a width of a measurement target based on a distance in the plane between the at least two calculated contact positions, wherein:

the drive controller is configured to control the position shift drive unit so as to cause the probe to contact at least two points of the measurement target in order to calculate the width of the measurement target of the workpiece; and the machining start position calculator is configured to calculate the machining start position based on the width of the measurement target and the offset amount, and wherein the machining start position is a center of the width of the measurement target or a position shifted from the center by a predetermined distance, with respect to a width direction of the measurement target.

2. The wire electrical discharge machine according to claim 1, further comprising a probe drive controller configured to cause a probe drive unit to move the probe to a measurement position when the probe performs contact detection and further configured to cause the probe drive unit to move the probe to a retreated position after the contact detection by the probe is completed, wherein the probe drive controller is configured to cause the probe drive unit to move the probe to the retreated position before the drive controller starts moving the wire electrode to the machining start position.

3. The wire electrical discharge machine according to claim 2, wherein the retracted position includes a state in which the probe is raised in a z-axis direction that is perpendicular to the plane of the table so that a tip of the probe is kept out of contact with the workpiece.

4. The wire electrical discharge machine according to claim 2, wherein, after the drive controller starts moving the wire electrode from the machining start position, the probe driver controller moves the probe to the machining start position.

5. The wire electrical discharge machine according to claim 4, wherein, after the electrical discharge machining on the workpiece is finished, the drive controller moves the wire electrode to an end position that is different from the machining start position.

6. The wire electrical discharge machine according to claim 5, wherein the end position is located apart from the machining start position by the offset amount.

7. The wire electrical discharge machine according to claim 1, wherein:

the workpiece includes a main part having a predetermined thickness and extending along the plane, and a projected part protruding upward from an upper surface of the main part or a depressed part recessed downward from the upper surface of the main part; and the measurement target is the projected part or the depressed part.

8. The wire electrical discharge machine according to claim 1, further comprising an output unit configured to output the width of the measurement target to outside.

9. The wire electrical discharge machine according to claim 1, further comprising an output unit configured to output, as a position of the workpiece, the at least two calculated contact positions to outside.

10. The wire electrical discharge machine according to claim 1, further comprising an output unit configured to output the machining start position to an outside of the workpiece.

11. The wire electrical discharge machine according to claim 10, wherein the retracted position of the probe is located at a different position than the machining start position to the outside of the workpiece.

12. The wire electrical discharge machine according to claim 10, wherein an end position of the wire electrode is located at a different position than the machining start position of the wire electrode to the outside of the workpiece, and wherein the retracted position of the probe is located at the machining start position to the outside of the workpiece when the wire electrode is at the end position.

13. The wire electrical discharge machine according to claim 1, wherein the first contact position and the second contact position are parallel to a first axis of the plane with respect to the table, and wherein the first contact position and the second contact position are misaligned in a second axis of the plane with respect to the table.

14. The wire electrical discharge machine according to claim 1, wherein the first contact position and the second contact position are parallel to a first axis of the plane with respect to the table, and wherein the first contact position and the second contact position are aligned in a second axis of the plane with respect to the table.

15. The wire electrical discharge machine according to claim 1, wherein the machining start position is centered between the first contact position and the second contact position.

* * * * *